(12) United States Patent
Qu et al.

(10) Patent No.: US 10,989,938 B2
(45) Date of Patent: Apr. 27, 2021

(54) JIG FOR INSPECTING DISPLAY MODULE

(71) Applicants: BOE Technology Group Co., Ltd., Beijing (CN); Hefei Xinsheng Optoelectronics Technology Co., Ltd., Hefei (CN)

(72) Inventors: Faxin Qu, Beijing (CN); Zhengyuan Zhang, Beijing (CN); Yong Ding, Beijing (CN); Qingqiao Jia, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 254 days.

(21) Appl. No.: 16/099,039

(22) PCT Filed: Apr. 13, 2018

(86) PCT No.: PCT/CN2018/083029
§ 371 (c)(1),
(2) Date: Nov. 5, 2018

(87) PCT Pub. No.: WO2018/196635
PCT Pub. Date: Nov. 1, 2018

(65) Prior Publication Data
US 2019/0196234 A1 Jun. 27, 2019

(30) Foreign Application Priority Data
Apr. 28, 2017 (CN) .......................... 201720467598.4

(51) Int. Cl.
*G01B 5/20* (2006.01)
*G01B 5/00* (2006.01)
(Continued)

(52) U.S. Cl.
CPC .......... *G02F 1/1309* (2013.01); *G01B 5/0004* (2013.01); *G01B 5/20* (2013.01);
(Continued)

(58) Field of Classification Search
CPC ... G01B 11/03; G01B 11/028; G01B 11/2408; G01B 21/20; G01B 5/0004; G01B 5/20; G01B 5/285
(Continued)

(56) References Cited

U.S. PATENT DOCUMENTS

2009/0277030 A1* 11/2009 Zhang .................... G01B 7/305
33/533
2010/0134137 A1* 6/2010 Kida ...................... G09G 3/006
324/757.01
(Continued)

FOREIGN PATENT DOCUMENTS

CN 102455162 A 5/2012
CN 202472177 U 10/2012
(Continued)

OTHER PUBLICATIONS

Jun. 20, 2018—(WO) International Search Report and Written Opinion Appn PCT/CN2018/083029 with English Translation.

*Primary Examiner* — Yaritza Guadalupe-McCall
(74) *Attorney, Agent, or Firm* — Banner & Witcoff, Ltd.

(57) ABSTRACT

A jig for inspecting a display module, the display module including a display module body and a lug, the jig including a bottom plate and a cover plate, the cover plate operatively covering the bottom plate; the bottom plate being provided with a first flat portion and the cover plate being provided with a second flat portion, wherein the bottom plate is provided with a first concave portion surrounded by the first flat portion, and/or the cover plate provided with a second concave portion surrounded by the second flat portion, the
(Continued)

first concave portion and/or the second concave portion form(s) a receiving area for the display module body, and the first flat portion and the second flat portion are configured to clamp the lug.

20 Claims, 1 Drawing Sheet

(51) Int. Cl.
    *G01B 5/28*     (2006.01)
    *G02F 1/13*     (2006.01)
    *G02F 1/13357*     (2006.01)

(52) U.S. Cl.
    CPC .............. *G01B 5/285* (2013.01); *G02F 1/13* (2013.01); *G02F 1/1336* (2013.01)

(58) Field of Classification Search
    USPC .......................................................... 33/551
    See application file for complete search history.

(56) References Cited

U.S. PATENT DOCUMENTS

| | | | |
|---|---|---|---|
| 2012/0096727 A1* | 4/2012 | Zhang | G01B 5/285 |
| | | | 33/552 |
| 2018/0059468 A1* | 3/2018 | Zhang | G09G 3/006 |
| 2018/0330651 A1* | 11/2018 | Miyatani | G06F 1/1652 |
| 2019/0196234 A1* | 6/2019 | Qu | G01B 5/285 |

FOREIGN PATENT DOCUMENTS

| | | |
|---|---|---|
| CN | 203643705 U | 6/2014 |
| CN | 204595373 U | 8/2015 |
| CN | 205102763 U | 3/2016 |
| CN | 205404998 U | 7/2016 |
| CN | 206710736 U | 12/2017 |
| KR | 100612135 B1 | 8/2006 |

* cited by examiner

JIG FOR INSPECTING DISPLAY MODULE

The application is a U.S. National Phase Entry of International Application No. PCT/CN2018/083029 filed on Apr. 13, 2018, designating the United States of America and claiming priority to Chinese Patent Application No. 201720467598.4 filed on Apr. 28, 2017. The present application claims priority to and the benefit of the above-identified applications and the above-identified applications are incorporated by reference herein in their entirety.

TECHNICAL FIELD

Embodiments of the present disclosure relates to a jig for inspecting a display module.

BACKGROUND

Technologies for electronic display are more and more mature, and display modules are widely used in laptops, cell phones, televisions, and the like.

In the related art, the display modules usually comprise a display panel and a backlight module. The backlight module further comprises lugs. The lugs are disposed on two opposite sides of the backlight module and extend outward, and are configured to fix the display module to an application device. At present, the deformation of the lugs is inspected by manual detection. However, there is no reference standard, and at the same time, each lug needs to be inspected, which leads to excessive inspection time and even leads to missed detection.

SUMMARY

At least one embodiment of the present disclosure provides a jig suitable for inspecting a display module, the display module comprising a display module body and a lug, the jig comprising a bottom plate and a cover plate, the cover plate operatively covering the bottom plate, the bottom plate being provided with a first flat portion and the cover plate being provided with a second flat portion, wherein the bottom plate is provided with a first concave portion surrounded by the first flat portion, and/or the cover plate is provided with a second concave portion surrounded by the second flat portion, the first concave portion and/or the second concave portion form(s) a receiving area for the display module body, and the first flat portion and the second flat portion are configured to clamp the lug.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

Figure 1:
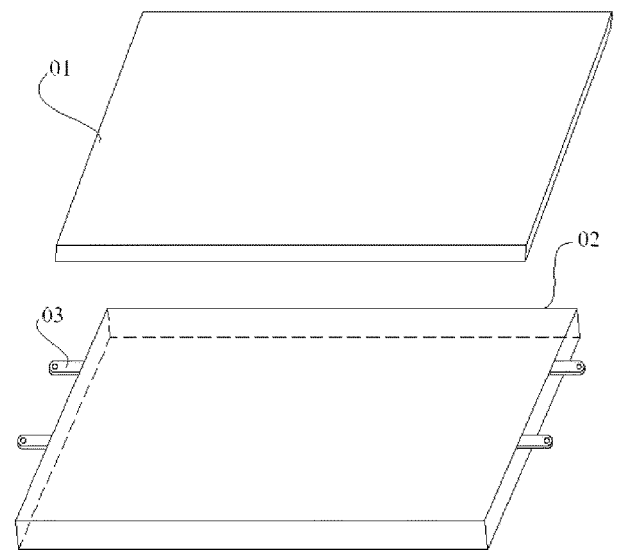
FIG. 1 is an illustrative structural view of a liquid crystal display module in the related art.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

In the description of the present disclosure, it is to be understood that the orientational or positional relationships indicated by the terms of "center", "upper", "lower", "front", "back", "left", "right", "vertical", "horizontal", "top", "bottom", "inside", "outside" and the like are based on the orientational or positional relationships shown in the drawings, and are merely used to facilitate the description of the present disclosure and simplify the description, rather than indicate or imply that the device or component referred to must have a specific orientation, be constructed and operated in a particular orientation, and thus should not be construed as limiting the present disclosure.

Conventional display modules are liquid crystal display modules and OLED display modules. Taking a liquid crystal display module as an example, FIG. 1 is an illustrative structural view of a liquid crystal display module in the related art, the liquid crystal display module comprising a liquid crystal display panel 01 and a backlight module 02. The backlight module 02 guides light emitted from a light source to the liquid crystal display panel 01 so as to display an image or a text. The backlight module 02 further comprises lugs 03. The lugs 03 are disposed at two opposite sides of the backlight module 02 and extend outwardly. The lugs 03 are configured to secure the liquid crystal display module to an application device (for example, a casing of a computer display screen).

Since the lugs 03 protrude to the outside of the liquid crystal display panel 01, they are inclined to be deformed due to external forces during transportation or conveyance. At present, the deformation of the lugs is manually inspected by placing the liquid crystal module on an inspection table and directly observing whether the lugs are deformed. Since there is no reference standard, it is not conducive to observation and the inspection time is relatively long. And, each lug needs to be inspected separately, and inspection is likely to be missed when the number of the lugs is relatively large.

Figure 2:
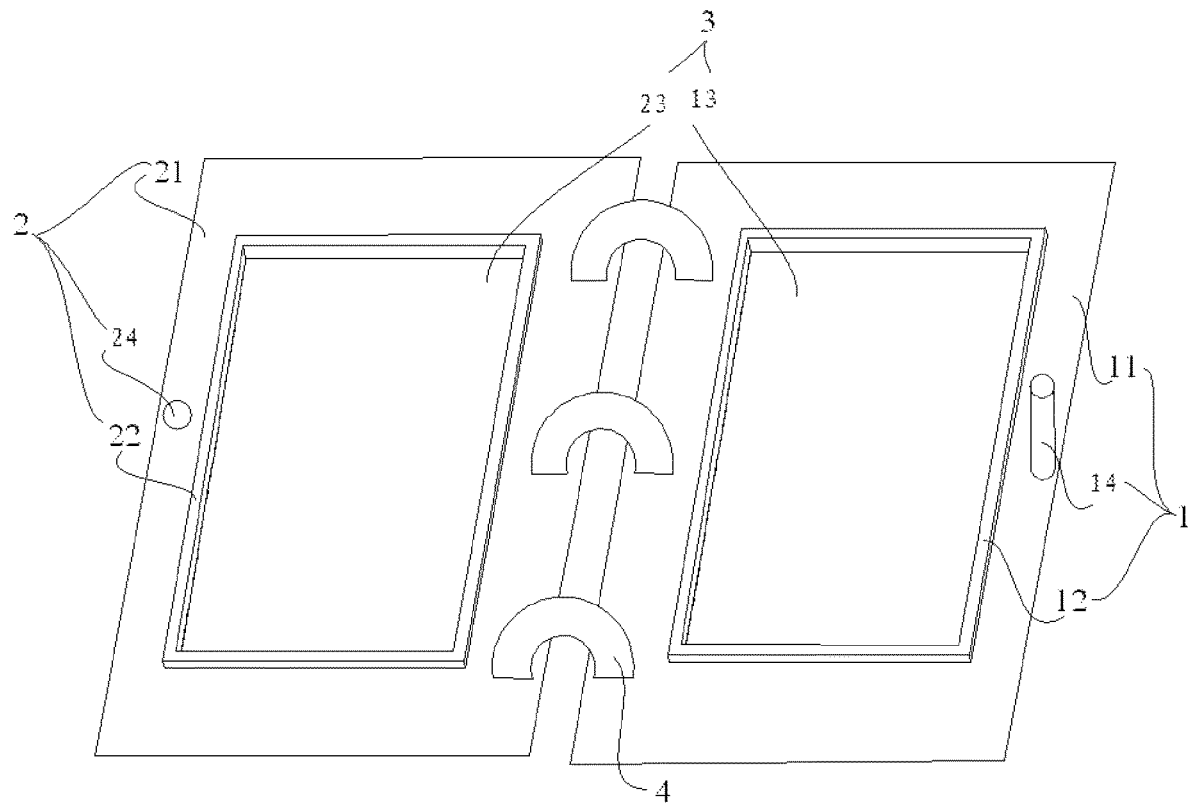
FIG. 2 is an inspection jig for a display module lug according to one embodiment of the present disclosure.

At least one embodiment of the present disclosure provides a jig for inspecting a display module. The display module comprises a display module body and lugs (the backlight module 02 (display module body) as shown in FIG. 1 and the lugs 03). As illustrated in FIG. 2, the jig comprises a bottom plate 1 and a cover plate 2. The cover plate 2 operatively covers the bottom plate 1. The bottom plate 1 has a first flat portion 11 and the cover plate 2 has a second flat portion 21. The bottom plate 1 is provided with a first concave portion 13 surrounded by the first flat portion 11, and/or the cover plate 2 is provided with a second concave portion 23 surrounded by the second flat portion 21. The first concave portion 13 and/or the second concave portion form(s) a receiving area 3 for the display module body, and the first flat portion 11 and the second flat portion 21 are configured to clamp the lugs 03.

When the jig for inspecting the display module according to the embodiment of the present disclosure is in use, the jig is placed horizontally, and then the display module is placed into the first concave portion 13 of the bottom plate 1, wherein the lugs of the display module overlap the edges of the first concave portion 13, that is, overlap the first flat portion 11, and then the cover plate 2 is closed onto the bottom plate 1 to allow observation of the levelness of the cover plate 2. If the levelness of the cover plate 2 is good, then the upper and lower surfaces of the lugs are respectively adhered to the first flat portion 11 and the second flat portion 21, which indicates that the lugs are not deformed. If the levelness of the cover plate 2 is poor, then the second flat portion 21 cannot be adhered to the upper surfaces of the lugs, and/or the first flat portion 11 cannot be adhered to the lower surfaces of the lugs, and thus it can be determined that the lugs are deformed. Since the second flat portion 21 of the cover plate 2 and the first flat portion 11 of the bottom plate 1 are used as references for observation, the lug inspection is made easier, the levelness of the cover plate 2 is easier to observe, and the inspection time for lug deformation can be shortened. In addition, even if the number of the lugs is large, no missed detection or misdetection occurs, for the reasons that a deformation of only one of the lugs will influence the levelness of the cover plate 2.

It should be noted that the bottom plate 1 comprises the first flat portion 11 and a first boss 12 disposed on the first flat portion 11. The first boss 12 is disposed along periphery of the edge of the receiving area 3 for the display module body. When the display module is placed in the body receiving area 3 of the bottom plate 1, the lugs of the display module overlap the first boss 12. If a lug is deformed, when a region on the cover plate 2 corresponding to the first boss 12 is pressed, the pressure is relatively concentrated, which is more labor-saving. Similarly, a boss structure can also be provided on the cover plate 2. For example, the cover plate 2 comprises a cover plate body 21 and a second boss 22 disposed on the cover plate body 21. The second boss 22 is disposed along the periphery of the edge of the receiving area for the display module body, that is, the position of the second boss 22 corresponds to the position of the first boss 12. The first boss 12 being disposed on the bottom plate body 11 or the second boss 22 being disposed on the cover plate body 21 is suitable for the occasion where the lugs of the display module are flush with the upper surface or the lower surface of the display module. For many commercially available display modules in which the lugs are disposed between the upper surface and the lower surface of the display module, the upper surface of the lug cannot be in contact with the cover plate 2, or the lower surface of the lug cannot be in contact with the bottom plate 1. In view of this, in the embodiment of the present disclosure, the first boss 12 is disposed on the first flat portion 11, and the second boss 22 is disposed on the second flat portion 21, which can enlarge the application range of the jig for inspecting the display module lug. In addition, the first boss 12 and the second boss 22 can be made of hard alloys or ferrous materials to ensure that the first boss 12 and the second boss 22 are not deformed when the cover plate 2 is pressed over and over to correct the lugs during a long period of time. The hardness of the first boss 12 should be greater than the hardness of the first flat portion 11, and the hardness of the second boss 22 should be greater than the hardness of the second flat portion 21.

In one embodiment of the present disclosure, the first concave portion 13 and/or the second concave portion 23 can be of a hollowed-out structure, for example, the first concave portion 13 is provided as a placement groove, correspondingly, and/or the second concave portion 23 is provided as a relief groove. The receiving area 3 for the display module body is formed by providing the first concave portion 13 on the bottom plate 1 as a placement groove and/or providing the second concave portion 23 on the cover plate 2 as a relief groove, and thus the structure is simple and easy to produce.

In one embodiment of the present disclosure, the first concave portion 13 and/or the second concave portion 23 can also be of a hollow structure, for example, the first concave portion 13 is formed as a hollow placement structure which can protect the surface of the display module, correspondingly, and/or the second concave portion 23 is formed as a hollow relief structure which can prevent contact with the surface of the display panel and avoid scratches.

In order to ensure accurate positioning of the cover plate 2 when covering the bottom plate 1, a first limit structure is provided on the bottom plate 1, and correspondingly, a second limit structure is provided on the cover plate 2 to cooperate with the first limit structure. The first limit structure is located at the first flat portion 11 of the bottom plate 1, and correspondingly, the second limit structure is located at the second flat portion 21 of the cover plate 2. The cover plate 2 and the bottom plate 1 can be accurately positioned by the fitting of the first limit structure and the second limit structure.

In one embodiment of the present disclosure, as illustrated in FIG. 2, the first limit structure is a limit post 14 disposed on the upper surface of the bottom plate 1, and the second limit structure is a limit hole 24 penetrating through the cover plate 2. When the cover plate 2 is closed, the limit post 14 is engaged with the limit hole 24 on the cover plate 2, thereby realizing the positioning of the cover plate 2 and the bottom plate 1. Optionally, the first limit structure can be a positioning pin, and correspondingly, the second limit structure is a positioning slot which fits the positioning pin.

In one embodiment according to the present disclosure, the bottom plate 1 and the cover plate 2 can be separate structures, and the bottom plate 1 and the cover plate 2 can also be connected with each other. In consideration that the bottom plate 1 and the cover plate 2 need to cooperate with each other during inspection of the display module, and the inspection jig of the separate structures is not convenient to store, in one embodiment of the present disclosure, the bottom plate 1 and the cover plate 2 are rotatably connected with each other to form a jig suitable for inspecting the display module. During the inspection of the display module, the cover plate 2 can be simply opened or closed for easy operation and convenient storage.

In one embodiment in accordance with the present disclosure, the rotatable connection structure of the bottom plate 1 and the cover plate 2 can be a hinge, a coil, or the like. For example, the bottom plate 1 and the cover plate 2 are rotatably connected by the coil 4, and the coil is inexpensive, easy to produce, and simple to assemble.

For example, the coil 4 connecting the bottom plate 1 and the cover plate 2 is arched or circular. An arched coil 4 is used in the embodiment of the present disclosure, and the coil 4 is made of iron, is inexpensive and is easy to form.

Further, the first flat portion 11 of the bottom plate 1 is made of a material having a high hardness and a low density, which reduces the deformation of the first flat portion 11, and the weight of the first flat portion 11 is relatively light and easy to pick up. In the embodiment of the present disclosure, the first flat portion 11 is made of phenolic plastic, namely, bakelite, which has a low density, a high hardness and good insulation performance, so as to prevent the display module from being affected by electrostatic factors.

The foregoing are merely exemplary embodiments of the disclosure, but the scope of protection of the present disclosure is not limited thereto. The protection scope of the disclosure shall be defined by the attached claims.

The present disclosure claims priority of Chinese Patent Application No. 201720467598.4 filed on Apr. 28, 2017, the disclosure of which is hereby entirely incorporated by reference as a part of the present disclosure.

The invention claimed is:

1. A jig suitable for inspecting a display module, the display module comprising a display module body and a lug, the jig comprising a bottom plate and a cover plate, the cover plate operatively covering the bottom plate, the bottom plate being provided with a first flat portion and the cover plate being provided with a second flat portion, wherein the jig further comprises at least one selected from the group consisting of a first concave portion provided on the bottom plate and surrounded by the first flat portion and a second concave portion provided on the cover plate and surrounded by the second flat portion, the at least one selected from the group consisting of the first concave portion and the second concave portion form(s) a receiving area for the display module body, and the first flat portion and the second flat portion are configured to clamp the lug.

2. The jig according to claim 1, wherein
in a case where the first concave portion selected from the group consisting of the first concave portion and the second concave portion forms the receiving area for the display module body, the bottom plate comprises a first boss, and the first boss is disposed on the first flat portion and surrounds the first concave portion;
in a case where the second concave portion selected from the group consisting of the first concave portion and the second concave portion forms the receiving area for the display module body, the cover plate comprises a second boss, and the second boss is disposed on the second flat portion and surrounds the second concave portion; and
in a case where the first concave portion and the second concave portion together form the receiving area for the display module body, the bottom plate comprises the first boss, and
the cover plate comprises the second boss.

3. The jig according to claim 2, wherein
in a case where the first concave portion selected from the group consisting of the first concave portion and the second concave portion forms the receiving area for the display module body, the first concave portion is formed as a placement groove;
in a case where the second concave portion selected from the group consisting of the first concave portion and the second concave portion forms the receiving area for the display module body, the second concave portion is formed as a relief groove; and
in a case where the first concave portion and the second concave portion together form the receiving area for the display module body, the first concave portion is formed as the placement groove, and the second concave portion is formed as the relief groove.

4. The jig according to claim 2, wherein
in a case where the first concave portion selected from the group consisting of the first concave portion and the second concave portion forms the receiving area for the display module body, the first concave portion is formed as a hollow placement groove;
in a case where the second concave portion selected from the group consisting of the first concave portion and the second concave portion forms the receiving area for the display module body, the second concave portion is formed as a hollow relief groove; and
in a case where the first concave portion and the second concave portion together form the receiving area for the display module body, the first concave portion is formed as the hollow placement groove, and the second concave portion is formed as the hollow relief groove.

5. The jig according to claim 2, further comprising a first limit structure and a second limit structure, the first limit structure is disposed on the first flat portion of the bottom plate, the second limit structure is disposed on the second flat portion of the cover plate, and the first limit structure and the second limit structure are configured to fit with each other.

6. The jig according to claim 2, wherein the bottom plate and the cover plate are rotatably connected with each other.

7. The jig according to claim 6, wherein the bottom plate and the cover plate are rotatably connected with each other by a coil.

8. The jig according to claim 1, wherein
in a case where the first concave portion selected from the group consisting of the first concave portion and the second concave portion forms the receiving area for the display module body, the first concave portion is formed as a placement groove;
in a case where the second concave portion selected from the group consisting of the first concave portion and the second concave portion forms the receiving area for the display module body, the second concave portion is formed as a relief groove; and
in a case where the first concave portion and the second concave portion together form the receiving area for the display module body, the first concave portion is formed as the placement groove, and the second concave portion is formed as the relief groove.

9. The jig according to claim 8, further comprising a first limit structure and a second limit structure, the first limit structure is disposed on the first flat portion of the bottom plate, the second limit structure is disposed on the second flat portion of the cover plate, and the first limit structure and the second limit structure are configured to fit with each other.

10. The jig according to claim 9, wherein the first limit structure is a limit post disposed on the first flat portion of the bottom plate, and the second limit structure is a limit hole penetrating through the cover plate.

11. The jig according to claim 10, wherein the first limit structure is a positioning pin, and the second limit structure is a positioning slot which is configured to fit with the positioning pin.

12. The jig according to claim 1, wherein
in a case where the first concave portion selected from the group consisting of the first concave portion and the second concave portion forms the receiving area for the display module body, the first concave portion is formed as a hollow placement groove;
in a case where the second concave portion selected from the group consisting of the first concave portion and the second concave portion forms the receiving area for the display module body, the second concave portion is formed as a hollow relief groove; and
in a case where the first concave portion and the second concave portion together form the receiving area for the display module body, the first concave portion is formed as the hollow placement groove, and the second concave portion is formed as the hollow relief groove.

13. The jig according to claim 1, further comprising a first limit structure and a second limit structure, the first limit structure is disposed on the first flat portion of the bottom plate, the second limit structure is disposed on the second flat portion of the cover plate, and the first limit structure and the second limit structure are configured to fit with each other.

14. The jig according to claim 13, wherein the first limit structure is a limit post disposed on the first flat portion of the bottom plate, and the second limit structure is a limit hole penetrating through the cover plate.

15. The jig according to claim 13, wherein the first limit structure is a positioning pin, and the second limit structure is a positioning slot which is configured to fit with the positioning pin.

16. The jig according to claim 1, wherein the bottom plate and the cover plate are rotatably connected with each other.

17. The jig according to claim 16, wherein the bottom plate and the cover plate are rotatably connected with each other by a hinge.

18. The jig according to claim 16, wherein the bottom plate and the cover plate are rotatably connected with each other by a coil.

19. The jig according to claim 18, wherein the coil is arched.

20. The jig according to claim 1, wherein the first flat portion of the bottom plate is made of phenolic plastic.

* * * * *